(12) United States Patent
Blarek et al.

(10) Patent No.: US 6,182,430 B1
(45) Date of Patent: Feb. 6, 2001

(54) LAWNMOWER BLADE

(76) Inventors: James A. Blarek, R-20076 Konkel Rd.; David A. Nemke, R-19402 Town Line Rd., both of Hatley, WI (US) 54440

(*) Notice: Under 35 U.S.C. 154(b), the term of this patent shall be extended for 0 days.

(21) Appl. No.: 09/310,116

(22) Filed: May 12, 1999

(51) Int. Cl.[7] .................................................. A01D 34/72
(52) U.S. Cl. ........................ 56/295; 56/17.5; 56/DIG. 17
(58) Field of Search ............................ 56/17.5, 255, 295, 56/DIG. 17, DIG. 20

(56) References Cited

U.S. PATENT DOCUMENTS

| Re. 31,542 |   | 3/1984 | Hetrick . |  |
|---|---|---|---|---|
| D. 289,524 |   | 4/1987 | Andersson et al. . |  |
| D. 357,691 |   | 4/1995 | Bryant . |  |
| 2,869,311 | * | 1/1959 | Beeston, Jr. | 56/295 |
| 2,898,725 |   | 8/1959 | Roesel . |  |
| 2,932,147 |   | 6/1960 | Beeston, Jr. . |  |
| 3,327,460 |   | 6/1967 | Blackstone . |  |
| 3,514,935 | * | 6/1970 | Bonsor | 56/295 |
| 3,769,784 | * | 11/1973 | Jones | 56/295 |
| 4,229,933 |   | 10/1980 | Bernard . |  |
| 4,375,148 | * | 3/1983 | Beck | 56/295 |
| 4,471,603 | * | 9/1984 | Veltin, Jr. | 56/295 |
| 4,611,460 | * | 9/1986 | Parker | 56/295 |
| 4,712,364 |   | 12/1987 | Oxley . |  |
| 4,750,320 | * | 6/1988 | Liebl | 56/295 |
| 5,303,535 |   | 4/1994 | Smith . |  |
| 5,467,586 |   | 11/1995 | Lin et al. . |  |
| 5,791,131 | * | 8/1998 | Hill et al. | 56/295 |

FOREIGN PATENT DOCUMENTS 2 036 524    7/1980   (GB) .

* cited by examiner

*Primary Examiner*—Thomas B. Will
*Assistant Examiner*—Meredith C. Petravick
(74) *Attorney, Agent, or Firm*—Richard C. Litman

(57) ABSTRACT

A lawnmower blade assembly, including a replaceable cutting edge insert and method for its use. The cutting edge insert is disposed within a recess of a support member at each end of a centrally rotatable main blade. The recess has a blunted front edge, a back shoulder, an outside shoulder, and a passage for an insert release tab. Two threaded preset Allen bolts, protruding from the recess floor, are permanently locked into position. The bolts are not specifically designed to carry the load of the rotating lawnmower blade. The back and outside shoulders of the recess provide most of the force necessary to retain the insert against rotational and centrifugal forces. The cutting edge insert, having substantially the same profile as the recess, and having slotted holes for reception of the bolts, can be slid in and out of the recess. An interference-type friction fit exists between the preset bolt head and the floor of the recess. The insert, having a razor-sharp cutting edge along its bottom surface, cantilevers slightly over the blunted edge of the main blade. The insert has a release tab, flush with the outside edge of the support, enabling a user to easily tap the insert out of position when it is ready to be replaced. The outside and back shoulders are positioned to provide retaining forces against the insert.

7 Claims, 6 Drawing Sheets

LAWNMOWER BLADE

BACKGROUND OF THE INVENTION

1. Field of the Invention

The present invention relates to lawnmower blades, and more specifically, a replaceable insert for a rotary lawnmower blade.

2. Description of the Related Art

In the past, the sharpening of a mower blade required the removal of the entire blade. Once the blade was removed, a new edge could be ground or filed onto the blade. The blade would then have to be remounted onto the shaft. This procedure is difficult and time consuming. Various types of replaceable cutters have been proposed to avoid the resharpening and eventual loss of the rotary blade. Such replaceable blades have presented problems of one type or another with regard to the requirement of complex fabrications, strength of the replaceable cutter, weakened resistance to damage by foreign objects, and costs. In addition, there is the difficulty associated with stabilizing the blade in light of significant centrifugal forces, which fatigue the fasteners, bolts, rivets, etc. between the separable cutting edge and the main blade assembly.

Another problem with the blade assemblies of the prior art having separable cutting edges, is that the force of impact with an obstruction such as a rock or a root causes undue strain on the fasteners connecting the separable edge to the main blade assembly.

Related art blades having separable cutting edges sometimes require 5 horse power or more simply to rotate the blade due to the weight of the cutting edge attachments. Similarly, the separable cutting edge of the prior art is typically thicker and the blade assembly, to which the cutting edge is attached, requires larger bolts due to the lack of a stabilizing recess, which further increases the weight and thus the required horsepower. Finally, the problem with having a separable cutting edge retained by fasteners alone, as opposed to by a recessed shoulder, is the additional trouble involved with changing the blades, and the tools required to do so properly.

The present invention addresses the above problems that are evident in the following patents:

U.S. Pat. No. 4,229,933 issued October 1980 to Bernard discloses a separable mower blade having a slotted hole on the mower blade for reception of a bolt. The blade and stem are constructed so as to allow easy removal of the blade. However, Bernard does not disclose a recess and shoulder on the main blade assembly for reception of the cutting blade, and therefore, the bolt carries the load created by the spinning of the assembly, rather than the walls of the recess carrying the load.

U.S. Pat. No. 3,327,460 issued September 1964 to Blackstone teaches a blade assembly for a rotary mower that includes separable cutting blades but not inserts per se.

U.S. Pat. No. 5,303,535 issued April 1994 to Smith shows a mower blade with a separable cutting surface but no outside shoulder to counteract centrifugal force as in the present invention, and it requires large bolts requiring tools, to hold the cutting surface in place.

U.S. Pat. No. 5,467,586 issued November 1995 to Lin et al. teaches a replaceable cutting blade having multiple parts including a cover plate, multiple fasteners, but no outside shoulder.

U.S. Pat. No. 4,712,364 issued December 1987 to Oxley discloses a quick attachable and detachable mower blade assembly. U.S. Pat. No. 2,932,147 issued June 1957 to J. T. Beeston, Jr. shows an expendable cutting blade for a rotary mower. U.S. Pat. No. 2,898,725 issued August 1959 to J. F. Roesel discloses a rotary mower blade assembly having retractable blades. U.S. Pat. No. Re. 31,542 issued March 1980 to Hetrick shows a safety attachment for lawn mowers. British Pat. No. GB 2 036 524 to Houle, published July 1980 to Houle teaches a safety blade made from comminuted waste rubber.

U.S. Pat. No. Des. 357,691 issued April 1995 to Bryant illustrates a design patent for a one-piece lawn mower blade.

U.S. Pat. No. Des. 289,524 issued April 1987 to Andersson et. al. shows another design not suggestive of the present invention.

None of the above inventions and patents, taken either singularly or in combination, is seen to describe the instant invention as claimed. Thus a lawnmower blade solving the aforementioned problems is desired.

SUMMARY OF THE INVENTION

The invention is a lawnmower blade replaceable cutting edge insert for a rotary lawnmower, disposed upon a support member at each end of a main blade which is, of course, rotatable about a central axis. Of particularly concern is the blade's lower surface, i.e., the one facing the ground. The blade lower surface has a substantially rectangular recess within a front, outside corner of the support. The recess is defined by a back shoulder, a blunted front edge, an inside shoulder, and an outside shoulder, opposite the inside shoulder. The outside shoulder extends from the back shoulder along a portion of the outside edge, but does not extend all the way to the blunted edge, so as to form an insert release passage along the outside edge.

Two threaded preset Allen bolts protrude from the floor of the recess. The bolts are permanently locked into position so the bolt heads remain above the recess floor a dimension substantially equivalent to the recess depth. The bolts are not specifically designed to carry the blade load. The back and outside shoulders of the recess provide most of the force necessary to retain the insert against rotational and centrifugal forces of the blade.

A cutting edge insert having substantially the same profile as the recess slides in and out of the recess, maintaining an interference-type friction fit between the preset bolt and the floor of the recess. The insert has a featheredge that transitions into a razor-sharp cutting edge along its bottom surface. The cutting edge cantilevers slightly over the blunted edge. The insert has a release tab receivable within the insert release passage so as to form an outer-most segment of cutting edge. The release tab is flush with the outside edge of the support, enabling a user access so that he or she can use the tab to easily tap the insert out of position when it is ready to be replaced. Moreover, the passage enables an extension of the cutting edge all the way to the outside edge of the blade support. The insert itself is shorter in length than the recess so that it can be slid in and out of its cutting position with the aid of a slotted hole in the insert which acts as a guide, just as the recess acts as a track.

As the lawnmower is started, the outside shoulder and bolts simultaneously provide a retaining centripetal force against the insert. The back shoulder provides a retaining force against the insert in a direction normal to a longitudinal axis of the blade assembly.

To change the cutting edge insert, its release tab is tapped lightly to disengage the insert from the outside shoulder until the hole on the slotted hole lines up with the preset bolt, at which point the insert can be removed from the recess. A new insert can then be hand-placed onto the recess, and similarly slid into place.

Accordingly, it is a principal object of the invention to provide simplicity in maintaining a razor sharp lawnmower blade that is always in balance during operation of the lawnmower.

It is another object of the invention to provide a cutting edge insert for a lawnmower blade assembly that can be lightly tapped in and out of place on the blade assembly while the motor is off, and one that requires no special tools, fasteners, or knowledge to change or to install.

It is a further object of the invention to provide inserts that are interchangeable on the lawnmower blade assembly, i.e., there is no right or left insert.

Still another object of the invention is to provide a lawnmower blade insert such that there would not be a need to remove the main blade assembly to sharpen the cutting edge.

It is an object of the invention to provide improved elements and arrangements thereof for the purposes described which is inexpensive, dependable and fully effective in accomplishing its intended purposes. These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
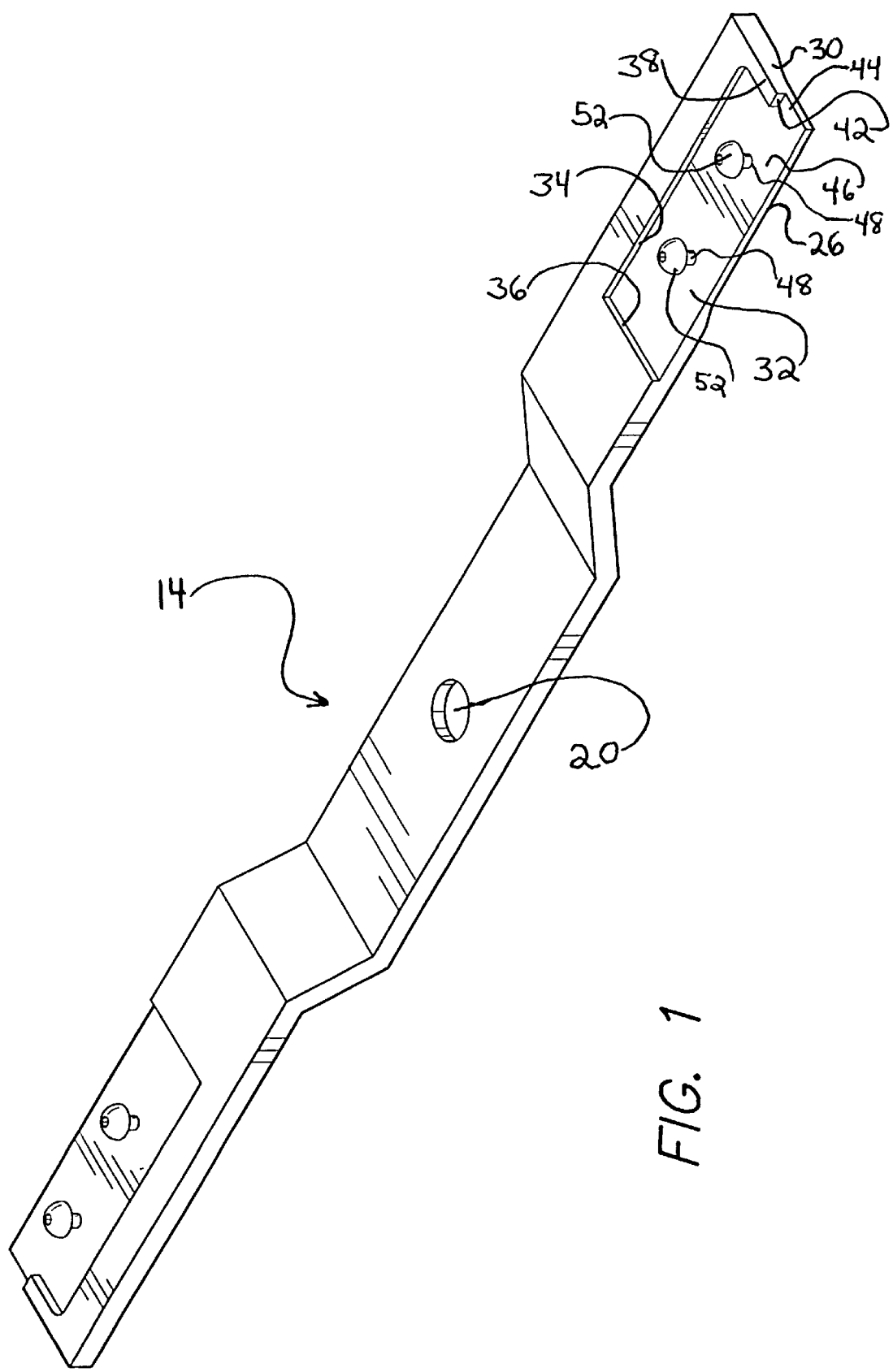
FIG. 1 is an environmental perspective/bottom view of main blade assembly, without the blade insert.
Figure 4:
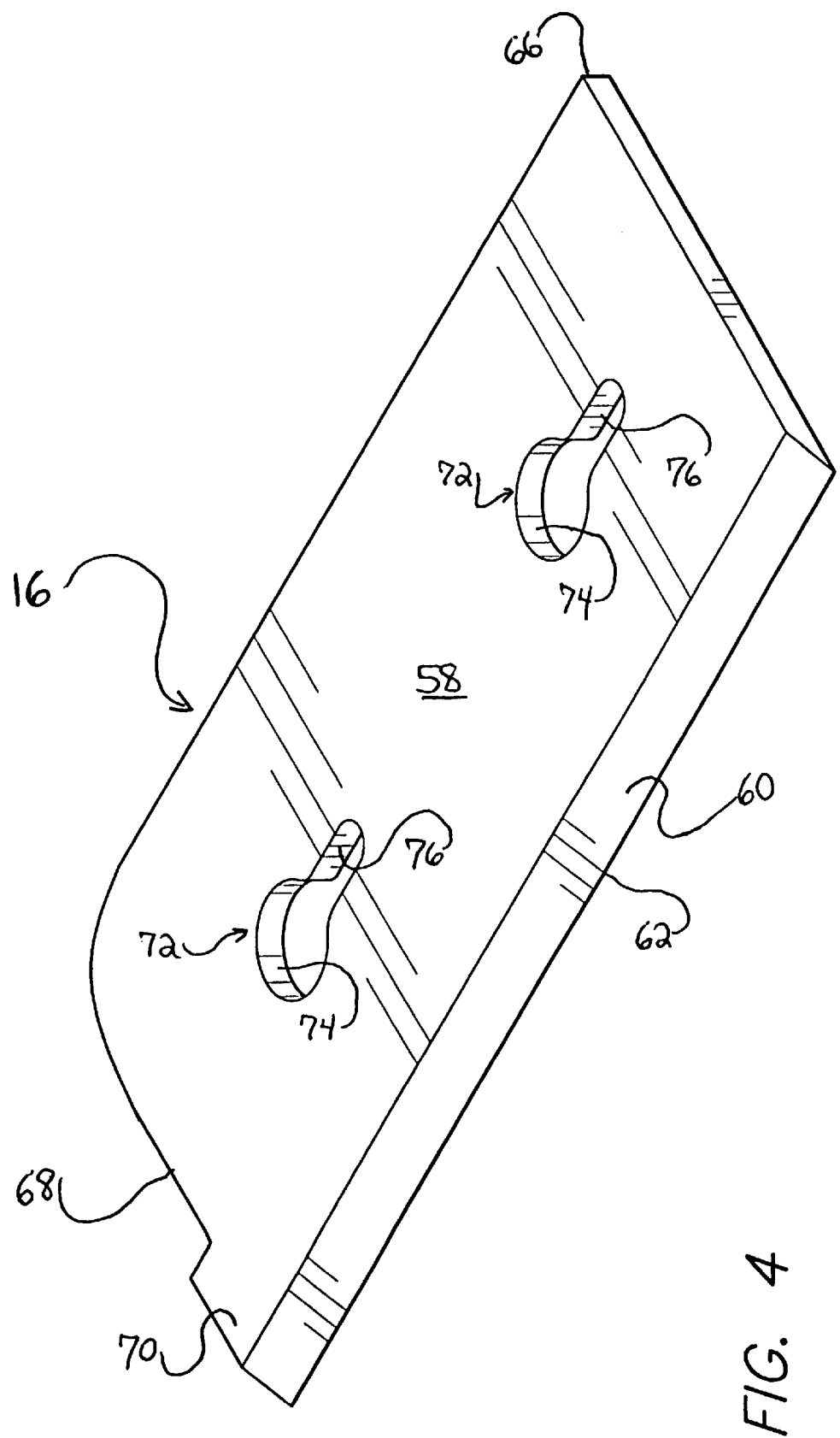
FIG. 4 is a perspective view of the receiving surface, opposite bottom surface, of the cutting edge replaceable insert.
Figure 5:
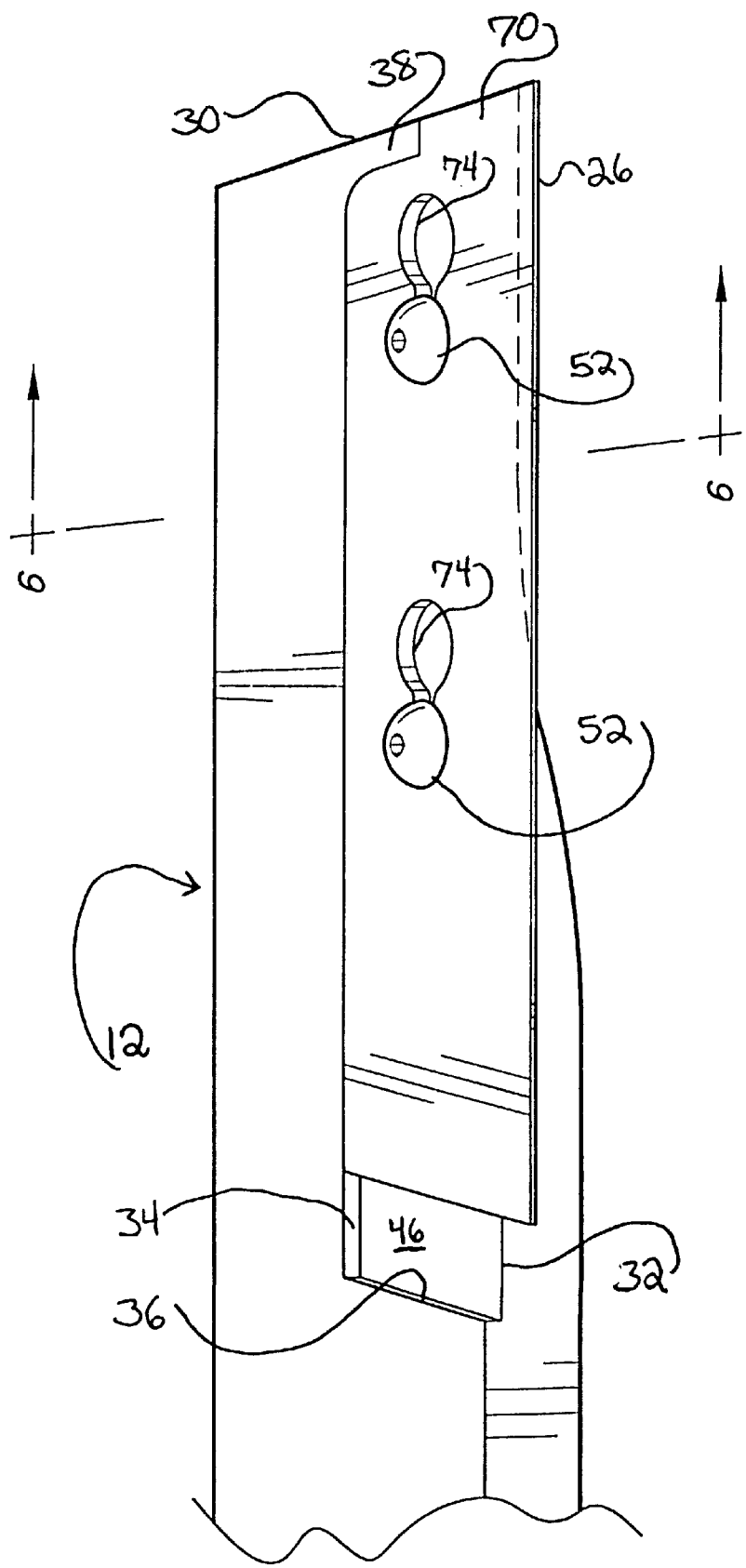
FIG. 5 is a perspective view of blade with insert in cutting position.

As best shown in FIG. 5, the present invention is a rotary lawnmower blade assembly 12 comprised of an elongated main blade 14, shown in FIG. 1, which defines a longitudinal axis, and a cutting edge insert 16, best shown in FIG. 4. Main blade 14 has an insert support 18, shown in FIG. 2, at each of two opposite ends of blade 14.

Figure 6:
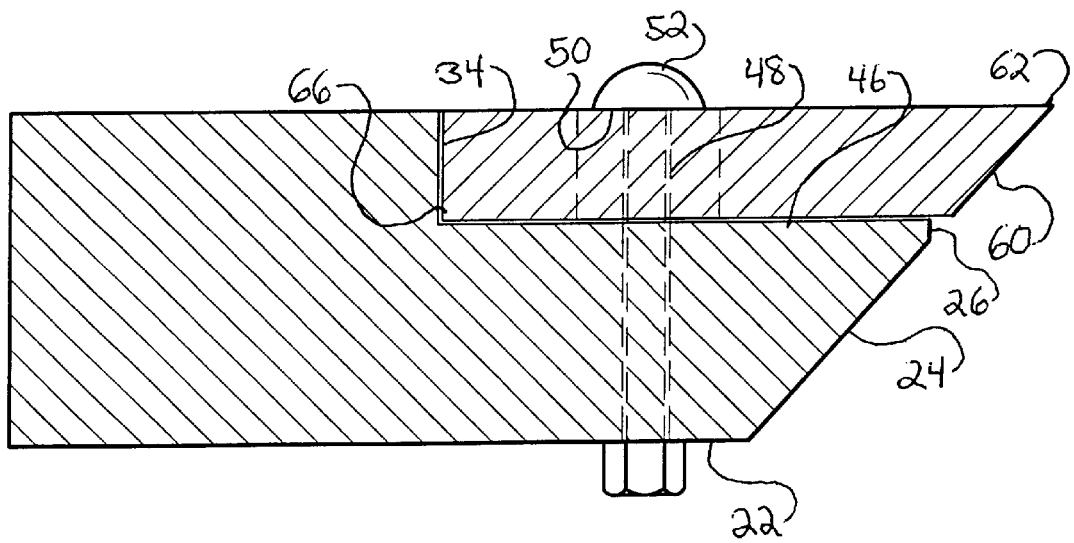
FIG. 6 is an enlarged scale, section view taken through the blade assembly.

Support 18 is connected to and rotatable about a central axis 20. As shown in FIG. 6, support 18 has an upper surface 22, facing upwardly in operation, and a chamfered edge 24 that transitions into a coextensive blunted edge 26 along a lower surface 28, which faces downwardly in operation. Blunted edge 26 may also be referred to as a leading edge, or as a blunted leading edge. Chamfered edge 24 serves to reduce friction between the assembly and the severed blades of grass. Preferably, blunted edge 26 has a thickness of approximately 3/16th of an inch, but tapers down to a thickness of 1/16th of an inch towards outside edge 30, of support 18. The tapering of blunted edge 26 again, serves to prevent the blade assembly from gathering grass or from interfering with the flow of severed grass blades as they are expelled across upper surface 22.

Lower surface 28 comprises outside edge 30, farthest from central axis 20, and a substantially rectangular recess 32 within a corner of the support, the corner defined by where blunted edge 26 meets outside edge 30. Recess 32 may also be referred to as a "recessed track."

Figure 2:
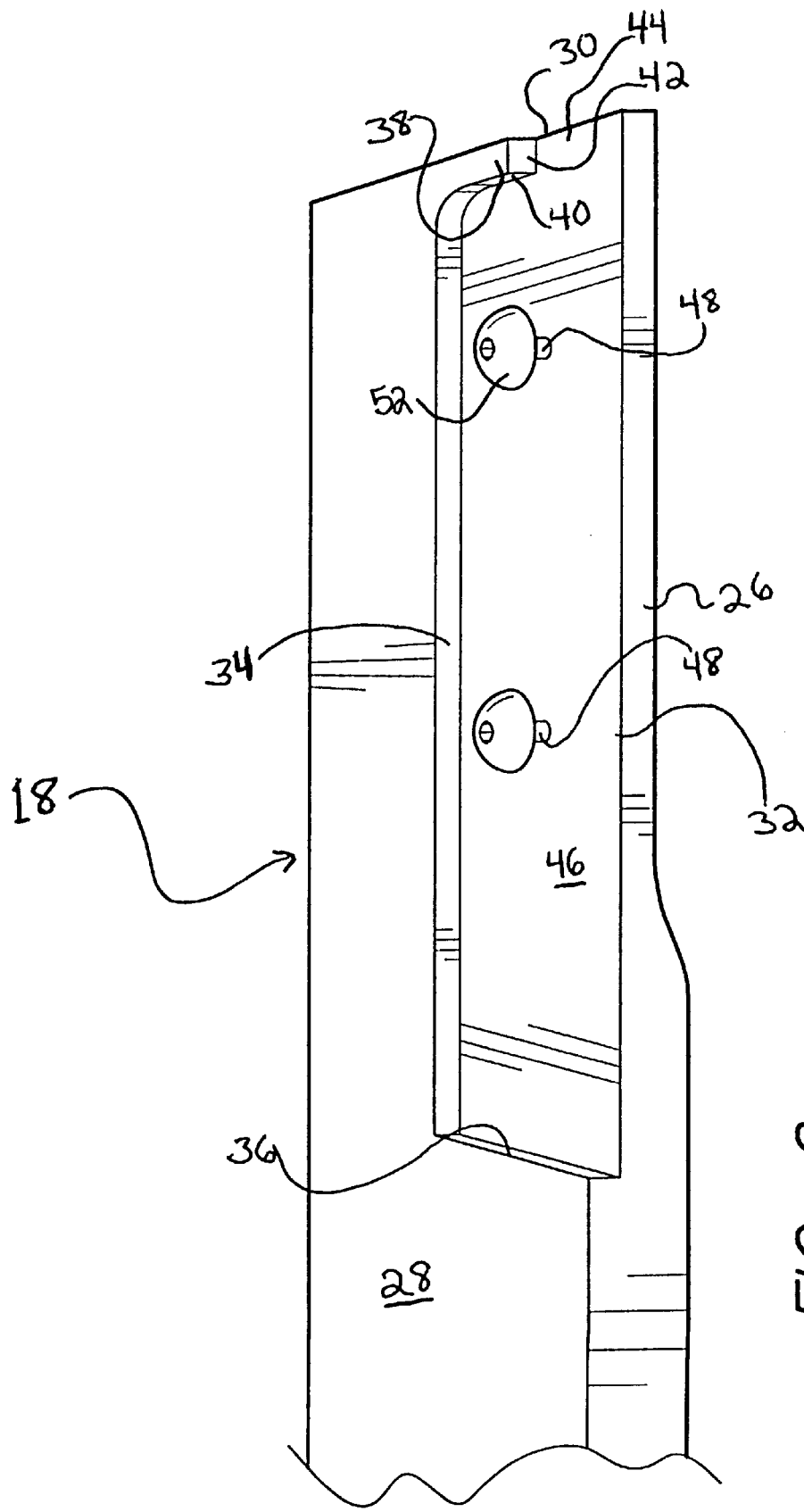
FIG. 2 is a perspective/bottom view of right end of main blade assembly, without inserts.
Figure 3:
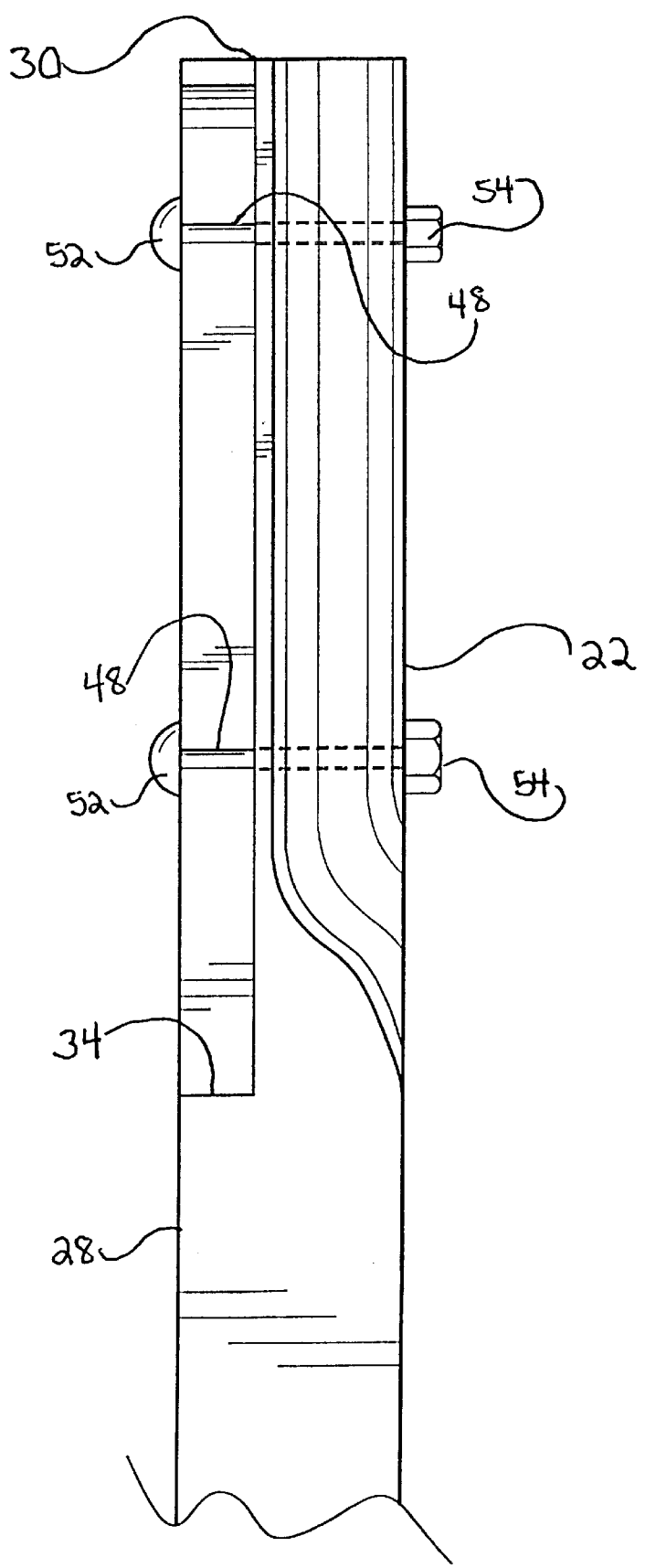
FIG. 3 is an elevation view facing the blunted edge of the main blade, without an insert.

As shown in FIG. 2, recess 32 has a back shoulder 34, or wall, opposite and parallel to blunted edge 26, which extends the length of blunted edge 26. Recess 32 has an inside shoulder 36, or wall, extending from back shoulder 34 to blunted edge 26, and an outside shoulder 38, opposite inside shoulder 36. Outside shoulder 38 extends from back shoulder 34 along a portion of outside edge 30, but does not extend all the way to blunted edge 26. Outside shoulder 38 has an inside face 40 substantially normal to back shoulder 34, and an outside face 42 substantially parallel to back shoulder 34. Recess 32 has an insert release passage 44 formed along outside edge 30. Passage 44 extends from blunted edge 26 to the outside face 42 of outside shoulder 38. Recess 32 has a substantially rectangular floor 46 extending from said blunted edge to the base of each shoulder. Floor 46 also extends to outside edge 30 through passage 44.

In the preferred embodiment, two threaded, grade 8, gauge 10-preset pan-head Allen bolts 48 protrude from floor 46. Bolts 48 are permanently locked into position such that an engaging surface 50 of the head 52 of bolts 48 remains at a distance above floor 46 that is substantially equivalent to the depth of recess 32. In the alternative, preset shoulder rivets may be used such that the head of each shoulder rivet is also at a preset height above floor 46. In addition, any suitable number of preset bolts may be used although, again, two are preferred. In the present invention, bolts 48 are not specifically designed to carry the load of the centrifugal and rotational forces of the blade, as will be discussed further. Suffice it to say, back shoulder 34 and outside shoulder 38 carry most of the load caused by rotational and centrifugal forces.

Whether bolts 48 are Allen bolts, shoulder rivets, or other kind of preset, peg-type retainer, they are preferably held in place through bores extending from floor 46 to upper surface 22. The two bolts 48 of the preferred embodiment form a line that is substantially normal to outside edge 30, and further aligned substantially mid-way between back shoulder 34 and blunted edge 26. In the preferred embodiment, a locking jam nut 54 abuts upper surface 22 and secures preset bolts 48.

As best shown in FIGS. 4, 5, and 6, a cutting edge insert 16, having substantially the same profile as recess 32, is formed for sliding insertion into recess 32. Insert 16 has a thickness slightly less (in the range of thousandths of an inch) than the distance between floor 46 and engaging surface 50 of bolt head 52. According to this structure, an interference-type friction fit is maintained against insert 16 by the combination of bolt head 52 and floor 46.

Insert 16 further comprises a receiving surface 58 slidably engageable with floor 46. Receiving surface 58 of insert 16 has a featheredge 60 parallel to blunted edge 26. The purpose of featheredge 60 is to further facilitate the flow of severed grass over upper surface 22. Featheredge 60 transitions into a razor-sharp cutting edge 62 along a bottom surface 64, opposite receiving surface 58. Cutting edge 62 cantilevers slightly over blunted edge 26.

Preferably, cutting edge 62 extends over blunted edge 26 by a distance of anywhere between 1/16th and 1/4th of an inch.

Insert 16 has a back edge 66, opposite cutting edge 62, abutting back shoulder 34. Insert 16 has a locking edge 68 extending from back edge 66 and abutting inside face 40 of outside shoulder 38. Insert 16 has an insert release tab 70 receivable within insert release passage 44 so as to form an outer-most segment of cutting edge 62. Tab 70 is flush with outside edge 30 of support 18.

Passage 44 and tab 70 are critical because passage 44 enables a user access to the insert so that he or she can easily tap the insert out of position when it is ready to be replaced. Moreover, passage 44 enables the extension of cutting edge 62 all the way to the outside edge of support 18. Otherwise, support 18 would tend to chew up the grass before it could be properly severed by insert 16. Insert 16 also incorporates a slotted hole 72 extending from said receiving surface 58 to the bottom surface of insert 16. Slotted hole 72 is formed from a round hole 74 connected to a narrower slot 76.

Insert 16 is shorter in length than recess 32 by at least a distance equal to the length between the center of hole 74 and the radial center of an arc forming a closed end of slot 76. The length differential between recess 32 and insert 16 enables the insert to slide along recess 32 into cutting position. As the lawnmower is started, outside shoulder 38 and bolts simultaneously provide a retaining centripetal force against insert 16 as back shoulder 34, and outside face 42, and bolts 48 provide a retaining force against insert 16 in a direction normal to said longitudinal axis of blade assembly 12.

The preferred method of changing cutting edge insert 16 involves tapping lightly, from outside edge 30 of lawnmower blade support 18, on release tab 70 of a used insert 16 such that insert 16 slides longitudinally along a support recess 32 from outside edge 30 of support 18. Next, insert 16 is lifted out from recess 32, and a new insert 16 is hand-placed onto recess 32. Slotted hole 72, formed within insert 16, is placed over the head of preferably a preset bolt, or in the alternative, a preset shoulder rivet protruding from the floor of recess 32. The next step is to slide insert 16 such that locking edge 68 and release tab 70 of insert 16 slides longitudinally to outside shoulder 38 of recess 32, and to outside edge 30 of support 18, respectively, such that insert 16 is in cutting position, and ready to use.

It is to be understood that the present invention is not limited to the embodiments described above, but encompasses any and all embodiments within the scope of the following claims.

We claim:

1. A rotary lawnmower blade assembly, comprising:

an elongated main blade defining a longitudinal axis, said blade having an insert support at each of two opposite ends, each said support connected and rotatable about a central axis, said support further comprising:

an upper surface having a chamfered edge that transitions into a coextensive blunted edge along a lower surface, said lower surface having an outside edge furthest from said central axis and a substantially rectangular recess within a corner of said support, said corner defined by where said blunted edge meets said outside edge, said recess further comprising:

a back shoulder opposite and parallel to said blunted edge, and extending the length of said blunted edge;

an inside shoulder extending from said back shoulder to said blunted edge;

an outside shoulder, opposite from said inside shoulder, extending from said back shoulder along a portion of said outside edge, said outside shoulder having an inside face substantially normal to said longitudinal axis, and an outside face substantially parallel to said longitudinal axis;

an insert release passage formed along said outside edge and extending from said blunted edge to said outside face of said outside shoulder;

a substantially rectangular floor extending from said blunted edge to a base of each of said shoulders, and extending to said outside edge through said passage;

a plurality of threaded preset bolts protruding from said floor, each one of said plurality of bolts having a head and being permanently locked into position such that an engaging surface of the head of each of said bolts remains at a distance above said floor that is substantially equivalent to the depth of said recess; and a plurality of bores formed through said support and extending from said floor to said upper surface to accommodate said bolts, said plurality of bolts forming a line substantially parallel to said longitudinal axis;

a locking jam nut abutting said upper surface for engaging each of said preset bolts; and a cutting edge insert having substantially the same profile as said recess, said insert formed for insertion into said recess and having a thickness slightly less than the distance between said floor and said engaging surface of said head of each of said bolts, such that said head and said floor maintain an interference-type friction fit against said insert, said insert further comprising:

a receiving surface slidably engageable with said floor and having a featheredge parallel to said blunted edge, said featheredge transitioning into a razor-sharp cutting edge along a bottom surface, opposite said receiving surface, said cutting edge cantilevering slightly over said blunted edge;

a back edge opposite said cutting edge and abutting said back shoulder;

a locking edge extending from said back edge, and abutting said inside face of said outside shoulder;

an insert release tab receivable within said insert release passage so as to form an outer-most segment of said cutting edge, said tab being flush with said outside edge of said support; and a slotted hole formed, through said insert, from a round hole connected to a narrow slot.

2. The device according to claim 1, wherein said insert is shorter in length than said recess by at least the distance between the center of said hole and the radial center of an arc forming a closed end of said slot.

3. A rotary lawnmower blade assembly comprising:

an elongated member having a central axis, a longitudinal axis, an upper surface and a lower surface, a first end and a second end, said first end and said second end disposed along said longitudinal axis and being rotatable about said central axis;

said first end and said second end each including a recessed track in said lower surface of said elongated member, each said recessed track being bounded by a blunted leading edge, an outside edge, a back shoulder, an inside shoulder and an outside shoulder of each said first and second ends of said elongated member;

wherein said outside shoulder including an outside face, said outside face being parallel to said blunted leading edge, said outside edge extending between said outside face and said blunted leading edge forming an insert passage between said blunted leading and said outside face along said outside edge;

at least one fastener rigidly affixed to each said recessed track, each said at least one fastener having a head portion and a shaft portion, said head portion having a substantially greater diameter than said shaft portion and said shaft portion having a length substantially equal to the depth of each said recessed track;

a cutting insert removably installed in each said recessed track, said cutting insert including a back edge, a cutting edge, a locking edge and at least one aperture;

wherein said back edge of said cutting insert abuts said back shoulder of each said recessed track, said cutting edge of said cutting insert extends forward said blunted leading edge of each said recessed track, said locking edge of said cutting insert extends through said insert passage and abuts said outside face of said outside shoulder of each said recessed track and each of said at least one aperture engages a respective one of said at least one fastener.

4. The rotary lawnmower blade assembly according to claim 3, wherein each of said at least one apertures of said cutting insert including a hole having a diameter for permitting a respective said head of one of said at least one fasteners therethrough and a slot in communication with said hole, said slot having a width for permitting a respective said shaft of one of said at least one fasteners therethrough and preventing the respective said head the one said fastener therethrough.

5. The rotary lawnmower blade assembly according to claim 3, wherein said at least one fastener includes a plurality of threaded preset bolts protruding from each said recessed track, each one of said plurality of bolts having a head and being permanently locked into position.

6. The rotary lawnmower blade assembly according to claim 5, wherein each said recessed track including a plurality of bores formed therethrough, said plurality of bores accommodating said bolts whereby said plurality of bolts being aligned substantially parallel with said longitudinal axis.

7. The rotary lawnmower blade assembly according to claim 6, wherein each one of said threaded bolts further including a locking jam nut abutting said upper surface of said elongated member.

* * * * *